(12) United States Patent
Salvekar et al.

(10) Patent No.: US 8,989,320 B2
(45) Date of Patent: Mar. 24, 2015

(54) HARDWARE SIMPLIFICATION OF SIC-MIMO DECODING BY USE OF A SINGLE HARDWARE ELEMENT WITH CHANNEL AND NOISE ADAPTATION FOR INTERFERENCE CANCELLED STREAMS

(75) Inventors: Atul A. Salvekar, San Francisco, CA (US); Jia Tang, Campbell, CA (US); Jong Hyeon Park, San Jose, CA (US); Shantanu Khare, Chicago, IL (US)

(73) Assignee: QUALCOMM Incorporated, San Diego, CA (US)

( * ) Notice: Subject to any disclaimer, the term of this patent is extended or adjusted under 35 U.S.C. 154(b) by 1040 days.

(21) Appl. No.: 12/552,647

(22) Filed: Sep. 2, 2009

(65) Prior Publication Data

US 2011/0051858 A1 Mar. 3, 2011

(51) Int. Cl.
*H04L 27/06* (2006.01)
*H04L 1/06* (2006.01)
*H04B 1/7107* (2011.01)
*H04L 1/00* (2006.01)
*H04L 25/03* (2006.01)

(52) U.S. Cl.
CPC ..... *H04L 1/0631* (2013.01); *H04L 2025/03426* (2013.01); *H04L 1/06* (2013.01); *H04B 1/7107* (2013.01); *H04L 2025/03414* (2013.01); *H04L 1/0052* (2013.01); *H04L 1/005* (2013.01); *H04L 2025/0342* (2013.01)
USPC ........................................................ 375/341

(58) Field of Classification Search
USPC ................................................. 375/340, 341
See application file for complete search history.

(56) References Cited

U.S. PATENT DOCUMENTS

| | | | |
|---|---|---|---|
| 6,014,411 A | 1/2000 | Wang | |
| 6,166,667 A | 12/2000 | Park | |
| 7,162,683 B2 | 1/2007 | Bune | |
| 7,222,286 B2 | 5/2007 | Kim | |
| 8,199,034 B2 | 6/2012 | Salvekar et al. | |
| 8,325,863 B2 | 12/2012 | Stamoulis et al. | |
| 2003/0066018 A1 | 4/2003 | Yu et al. | |
| 2004/0258139 A1 | 12/2004 | Namgoong et al. | |
| 2006/0188044 A1 | 8/2006 | Wang et al. | |
| 2007/0041475 A1* | 2/2007 | Koshy et al. ............ 375/340 |
| 2007/0118786 A1 | 5/2007 | Lim et al. | |
| 2007/0140320 A1 | 6/2007 | Banna et al. | |
| 2007/0201632 A1 | 8/2007 | Ionescu | |

(Continued)

FOREIGN PATENT DOCUMENTS

| | | |
|---|---|---|
| CN | 1406415 A | 3/2003 |
| CN | 1838582 A | 9/2006 |

(Continued)

OTHER PUBLICATIONS

Tao Yang, Jinhong Yuan, University of New South Wales, Austalia, Zhenning Shi, National ICT Australia, Australia, Successive LLR Combining in the Iterative Receiver for MIMO-BICM Systems, IEEE 2007.*

(Continued)

*Primary Examiner* — Tanmay Shah
(74) *Attorney, Agent, or Firm* — Kenyon S. Jenckes

(57) ABSTRACT

Certain aspects of the present disclosure relate to a method and an apparatus for simplified serial interference cancellation in multiple-input multiple-output (MIMO) and non-MIMO wireless systems by using a single hardware element for multiple interference cancelled streams.

13 Claims, 8 Drawing Sheets

(56) References Cited

U.S. PATENT DOCUMENTS

| | | | |
|---|---|---|---|
| 2007/0230609 | A1 | 10/2007 | Hwang et al. |
| 2008/0069038 | A1 | 3/2008 | Yamamoto et al. |
| 2008/0304589 | A1 | 12/2008 | Tsuruta et al. |
| 2009/0031185 | A1 | 1/2009 | Xhafa et al. |
| 2009/0052578 | A1 | 2/2009 | Sawai |
| 2009/0067553 | A1 | 3/2009 | McElwain |
| 2009/0154599 | A1 | 6/2009 | Siti et al. |
| 2009/0254797 | A1 | 10/2009 | Wu et al. |
| 2009/0287859 | A1 | 11/2009 | Bond et al. |
| 2009/0296842 | A1 | 12/2009 | Papadopoulos et al. |
| 2009/0300463 | A1* | 12/2009 | Purkovic et al. ............... 714/755 |
| 2011/0007729 | A1 | 1/2011 | Nogami et al. |
| 2011/0051831 | A1 | 3/2011 | Subrahmanya et al. |
| 2011/0051860 | A1 | 3/2011 | Tang et al. |
| 2012/0249346 | A1 | 10/2012 | Salvekar et al. |

FOREIGN PATENT DOCUMENTS

| | | |
|---|---|---|
| CN | 201018490 Y | 2/2008 |
| CN | 101183919 A | 5/2008 |
| CN | 101321148 A | 12/2008 |
| CN | 101411086 A | 4/2009 |
| EP | 1217776 A2 | 6/2002 |
| EP | 1432129 A2 | 6/2004 |
| JP | 2000092025 A | 3/2000 |
| JP | 2003504938 A | 2/2003 |
| JP | 2006246341 A | 9/2006 |
| JP | 2008124843 A | 5/2008 |
| JP | 2008533912 A | 8/2008 |
| JP | 2009055228 A | 3/2009 |
| JP | 2009526486 A | 7/2009 |
| TW | I297244 B | 5/2008 |
| WO | 0105059 A1 | 1/2001 |
| WO | 0119013 A1 | 3/2001 |
| WO | 2006042326 | 4/2006 |
| WO | 2006099267 A2 | 9/2006 |
| WO | 2007000917 A1 | 1/2007 |
| WO | 2007095102 A1 | 8/2007 |
| WO | 2009104582 A1 | 8/2009 |

OTHER PUBLICATIONS

International Search Report and Written Opinion—PCT/US2010/047724, International Search Authority—European Patent Office—Feb. 14, 2011.

Bertrand M. Hochwald and Stephan Ten Brink: "Achieving Near-Capacity on aMultiple-Antenna Channel" IEEE Transactions on Communications, vol. 51, No. 3, Mar. 1, 2003, XP002603968.

Christophe Laot et al., "Turbo Equalization: Adaptive Equalization and Channel Decoding Jointly Optimized", IEEE Journal on Selected Areas in Communications, IEEE Service Center, Piscataway, US, vol. 19, No. 9, Sep. 1, 2001, XP011055452, ISSN: 0733-8716.

Duho Rhee et al., "Iterative Narrowband Jamming Rejection Technique for Coded OFDMA-CDM Systems", Military Communications Conference, 2009, MILCOM 2009, IEEE, IEEE, Piscataway, NJ, USA, Oct. 18, 2009, pp. 1-6, XP031609645, ISBN: 978-1-4244-5238-5.

Liu D N, et al., "Low complexity affine MMSE detector for iterative detection-decoding MIMO OFDM systems", IEEE Transactions on Communications, IEEE Service Center, Piscataway, NJ, US, vol. 56, No. 1, Jan. 1, 2008, pp. 150-158, XP011224730.

Ming Zhao, et al., "An Iterative Receiver with Channel Estimation for MIMO-OFDM Over a Time and Frequency Dispersive Fading Channel", Global Telecommunications Conference, 2007. GLOBECOM '07. IEEE, IEEE, Piscataway, NJ, USA, Nov. 1, 2007, pp. 4155-4159, XP031196718, DOI: DOI:10.1109/GLOCOM.2007.585 ISBN: 978-1-4244-1042-2.

Siti et al., "A Novel Soft-Output Layered Orthogonal Lattice Detector for Multiple Antenna Communications," IEEE ICC 2006 proceedings, pp. 1686-1691.

Siti, et al., "Layered Orthogonal Lattice Detector for Two Transmit Antenna Communications," In Allerton Conference on Communication, Control and Computing, Sep. 2005, pp. 1-10.

Tomasoni, Alessandro et al.: "Turbo-LORD: MAP-Approaching Soft-Input Soft-Output Detector for Iterative MIMO Receivers" IEEE GLOBECOM 2007 Proceedings, Global Telecommunications Conference. Piscataway, NJ, USA, (Nov. 1, 2007), pp. 3504-3508, XP031196593, ISBN: 978-1-4244-1042-2.

Tomasoni, et. al., "A low complexity turbo MMSE Receiver for W-LAN MIMO Systems," Proceedings of IEEE ICC 2006 [9], pp. 4119-4124.

Uhlemann E, et al., "Packet combining and doping in concatenated hybrid ARQ schemes using iterative decoding", Wireless Communications and Networking, 2003. WCNC 2003. 2003 IEEE Mar. 16-20, 2003, Piscataway, NJ, USA,IEEE LNKD-DOI:10.1109/WCNC.2003.1200482, vol. 2, Mar. 16, 2003, pp. 849-854, XP010639878.

Wooram Shin, et al., "Iterative LMMSE Channel Estimation, Detection, and Decoding with a Priori Information for ST-BICM Systems over Block Fading Channels", 2009 IEEE 69th Vehicular Technology Conference; Apr. 26-29, 2009, Barcelona, Spain, IEEE, Piscataway, NJ, USA, Apr. 26, 2009, pp. 1-6, XP031474572.

Yang Gao, et al., "A Novel HARQ Scheme Utilizing the Iterative Soft-information Feedback in MIMO System" I E E E V T S Vehicular Technology Conference. Proceedings, IEEE, US, Apr. 1, 2007, pp. 423-424, XP031092664.

Yeong-Luh Ueng, et al., "Turbo coded multiple-antenna systems for near-capacity performance" IEEE Journal on Selected Areas in Communications, IEEE Service Center, Piscataway US vol. 27, No. 6'Aug. 1, 2009, pp. 954-964, XP011264538 ISSN: 0733-8716.

Kim, Y., et al., "Hybrid MIMO Receiver Using QR-MLD and QR-MMSE," Global Telecommunications Conference, 2009. GLOBECOM 2009. IEEE, Dec. 4, 2009.

Yang, T., et al., "Jointly gaussian approximation and multi-stage LLR combining in the iterative receiver for MIMO-BICM systems," Wireless Communications, IEEE Transactions on, Dec. 2008, vol. 7, No. 12, pp. 5250-5256.

Yang, T., et al., "Successive LLR Combining in the Iterative Receiver for MIMO-BICM Systems," Global Telecommunications Conference, 2007. GLOBECOM '07. IEEE, Nov. 30, 2007, pp. 1775-1779.

Li Q., et al., "Improved Turbo Equalization Schemes Robust to SNR Estimation Errors,Achieving near-capacity on a multiple-antenna channel", Jun. 1, 2007,vol.E90-B, No. 6,pp. 1454-1459.

Miki N., et al., "Performance of Multipath Interference Canceller using Soft-Decision Replica Combined with Hybrid ARQ in High Speed Downlink Packet Access", RCS Technical Report of the Institute of Electronics, Information and Communication Engineers, Oct. 13, 2001, vol. 101, No. 371, pp. 99-104, RCS2001-165.

Gang Z. et al., "Strategy Design for LDPCC-HARQ Using Segment Selective Repeat", Journal of Telemetry, Tracking, and Command, Sep. 15, 2008, vol. 29, No. 5, Abstract.

Hatakawa Y. et al., "Proposal of Twin Turbo MIMO-OFDM", Technical Report of the Institute of Electronics, Information and Communication Engineers, Mar. 9, 2007, vol. 106, No. 597, pp. 35-40, IT2006-91, Abstract.

Takahashi Y. et al., "A Study on Time Domain Block Equalizer on MIMO Frequency Selective Channels", Technical Report of the Institute of Electronics, Information and Communication Engineers, Feb. 22, 2008, vol. 107, No. 499, pp. 147-152, WBS2007-102, Abstract.

Uhlemann E. et al., "Hard decision packet combining methods for industrial wireless relay networks," Second International Conference on Communications and Electronics (ICCE), Jun. 4-6, 2008, pp. 104-108.

\* cited by examiner

HARDWARE SIMPLIFICATION OF SIC-MIMO DECODING BY USE OF A SINGLE HARDWARE ELEMENT WITH CHANNEL AND NOISE ADAPTATION FOR INTERFERENCE CANCELLED STREAMS

BACKGROUND

1. Field

Certain aspects of the present disclosure generally relate to wireless communications and, more particularly, to a method and an apparatus for simplified decoding in multiple-input multiple-output (MIMO) systems and non-MIMO systems.

2. Background

A MIMO receiver with interference cancellation and maximum a posteriori decoding comprises a hardware element to gather log-likelihood ratio (LLR) information of transmitted bits, such as the minimum mean square error (MMSE) equalization block with LLR look-up table (LUT) or the Joint LLR (JLLR) detection block and any of its simplified versions such as the Max-Log Maximum a posteriori (MLM) decoding. In an exemplary case of two simultaneously transmitted independent data streams, one data stream can be typically decoded using an MMSE equalizer with adapted weights, which can be preceded by an interference cancellation of another data stream.

Two different decoding solutions can be distinguished in practice: the MMSE equalization with LLR LUT followed by another MMSE equalization with LLR LUT, and the JLLR decoding (or any of its simplified versions) followed by the MMSE equalization with LLR LUT. However, computational complexity, implementation cost and processing latency of both schemes can be prohibitively high.

Therefore, there is a need in the art for decoding scheme based on interference cancellation that has lower implementation cost and smaller processing latency, preferably with little or no adverse effect on error rate performance.

SUMMARY

Certain aspects provide a method for wireless communications. The method generally includes receiving at least one data stream, wherein each data stream from the at least one data stream was transmitted over a wireless channel, performing inner decoding of the at least one data stream using a first set of a priori log-likelihood ratios (LLRs) and a channel matrix to obtain a first set of extrinsic LLRs of transmitted bits of the at least one data stream, performing outer decoding of the first set of extrinsic LLRs to obtain a second set of a posteriori LLRs and decoded bits of the at least one data stream, cancelling interference of a data stream from the decoded bits and from the second set of a posteriori LLRs of the at least one data stream to obtain a signal with cancelled interference, and applying feedback processing using the signal with cancelled interference to obtain the channel matrix with updated coefficients and the updated first set of a priori LLRs, wherein the channel matrix with updated coefficients and the updated first set of a priori LLRs will be used for the inner decoding of the signal with cancelled interference.

Certain aspects provide an apparatus for wireless communications. The apparatus generally includes a receiver configured to receive at least one data stream, wherein each data stream from the at least one data stream was transmitted over a wireless channel, an inner decoder configured to perform inner decoding of the at least one data stream using a first set of a priori log-likelihood ratios (LLRs) and a channel matrix to obtain a first set of extrinsic LLRs of transmitted bits of the at least one data stream, an outer decoder configured to perform outer decoding of the first set of extrinsic LLRs to obtain a second set of a posteriori LLRs and decoded bits of the at least one data stream, a cancelling circuit configured to cancel interference of a data stream from the decoded bits and from the second set of a posteriori LLRs of the at least one data stream to obtain a signal with cancelled interference, if two or more independent data streams of the at least one data stream were simultaneously transmitted from multiple antennas, and a feedback circuit configured to apply feedback processing using the signal with cancelled interference to obtain the channel matrix with updated coefficients and the updated first set of a priori LLRs, wherein the channel matrix with updated coefficients and the updated first set of a priori LLRs will be used for the inner decoding of the signal with cancelled interference, if the two or more independent data streams were simultaneously transmitted from multiple antennas.

Certain aspects provide an apparatus for wireless communications. The apparatus generally includes means for receiving at least one data stream, wherein each data stream from the at least one data stream was transmitted over a wireless channel, means for performing inner decoding of the at least one data stream using a first set of a priori log-likelihood ratios (LLRs) and a channel matrix to obtain a first set of extrinsic LLRs of transmitted bits of the at least one data stream, means for performing outer decoding of the first set of extrinsic LLRs to obtain a second set of a posteriori LLRs and decoded bits of the at least one data stream, means for cancelling interference of a data stream from the decoded bits and from the second set of a posteriori LLRs of the at least one data stream to obtain a signal with cancelled interference, if two or more independent data streams of the at least one data stream were simultaneously transmitted from multiple antennas, and means for applying feedback processing using the signal with cancelled interference to obtain the channel matrix with updated coefficients and the updated first set of a priori LLRs, wherein the channel matrix with updated coefficients and the updated first set of a priori LLRs will be used for the inner decoding of the signal with cancelled interference, if the two or more independent data streams were simultaneously transmitted from multiple antennas.

Certain aspects provide a computer-program product for wireless communications. The computer-program product includes a computer-readable medium comprising instructions executable to receive at least one data stream, wherein each data stream from the at least one data stream was transmitted over a wireless channel, perform inner decoding of the at least one data stream using a first set of a priori log-likelihood ratios (LLRs) and a channel matrix to obtain a first set of extrinsic LLRs of transmitted bits of the at least one data stream, perform outer decoding of the first set of extrinsic LLRs to obtain a second set of a posteriori LLRs and decoded bits of the at least one data stream, cancel interference of a data stream from the decoded bits and from the second set of a posteriori LLRs of the at least one data stream to obtain a signal with cancelled interference, if two or more independent data streams of the at least one data stream were simultaneously transmitted from multiple antennas, and apply feedback processing using the signal with cancelled interference to obtain the channel matrix with updated coefficients and the updated first set of a priori LLRs, wherein the channel matrix with updated coefficients and the updated first set of a priori LLRs will be used for the inner decoding of the signal with cancelled interference, if the two or more independent data streams were simultaneously transmitted from multiple antennas.

Certain aspects provide a wireless node. The wireless node generally includes at least one antenna, a receiver configured to receive at least one data stream via the at least one antenna, wherein each data stream from the at least one data stream was transmitted over a wireless channel, an inner decoder configured to perform inner decoding of the at least one data stream using a first set of a priori log-likelihood ratios (LLRs) and a channel matrix to obtain a first set of extrinsic LLRs of transmitted bits of the at least one data stream, an outer decoder configured to perform outer decoding of the first set of extrinsic LLRs to obtain a second set of a posteriori LLRs and decoded bits of the at least one data stream, a cancelling circuit configured to cancel interference of a data stream from the decoded bits and from the second set of a posteriori LLRs of the at least one data stream to obtain a signal with cancelled interference, if two or more independent data streams of the at least one data stream were simultaneously transmitted from multiple antennas, and a feedback circuit configured to apply feedback processing using the signal with cancelled interference to obtain the channel matrix with updated coefficients and the updated first set of a priori LLRs, wherein the channel matrix with updated coefficients and the updated first set of a priori LLRs will be used for the inner decoding of the signal with cancelled interference, if the two or more independent data streams were simultaneously transmitted from multiple antennas.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
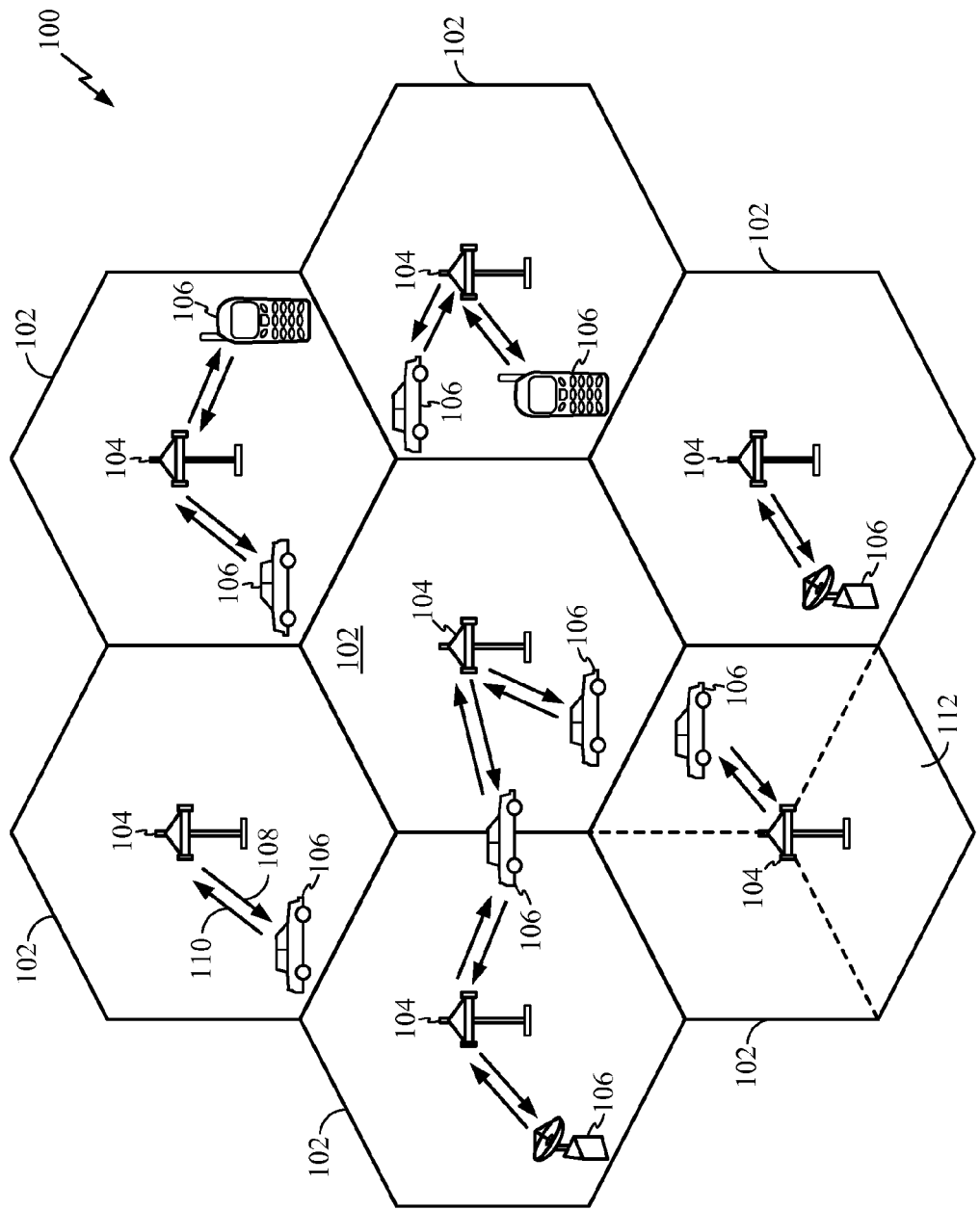
FIG. 1 illustrates an example wireless communication system, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme and a single carrier transmission. Examples of such communication systems include Orthogonal Frequency Division Multiple Access (OFDMA) systems, Single-Carrier Frequency Division Multiple Access (SC-FDMA) systems, Code Division Multiple Access (CDMA), and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A CDMA system may utilize spread-spectrum technology and a coding scheme where each transmitter (i.e., user) is assigned a code in order to allow multiple users to be multiplexed over the same physical channel. The CDMA system may utilize, for example, Wideband Code Division Multiple Access (W-CDMA) protocol, High Speed Packet Access (HSPA) protocol, evolved Speed Packet Access (HSPA+) protocol, etc.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with CDMA technique. If this is the case, the wireless communication system 100 may be referred to as a CDMA system.

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
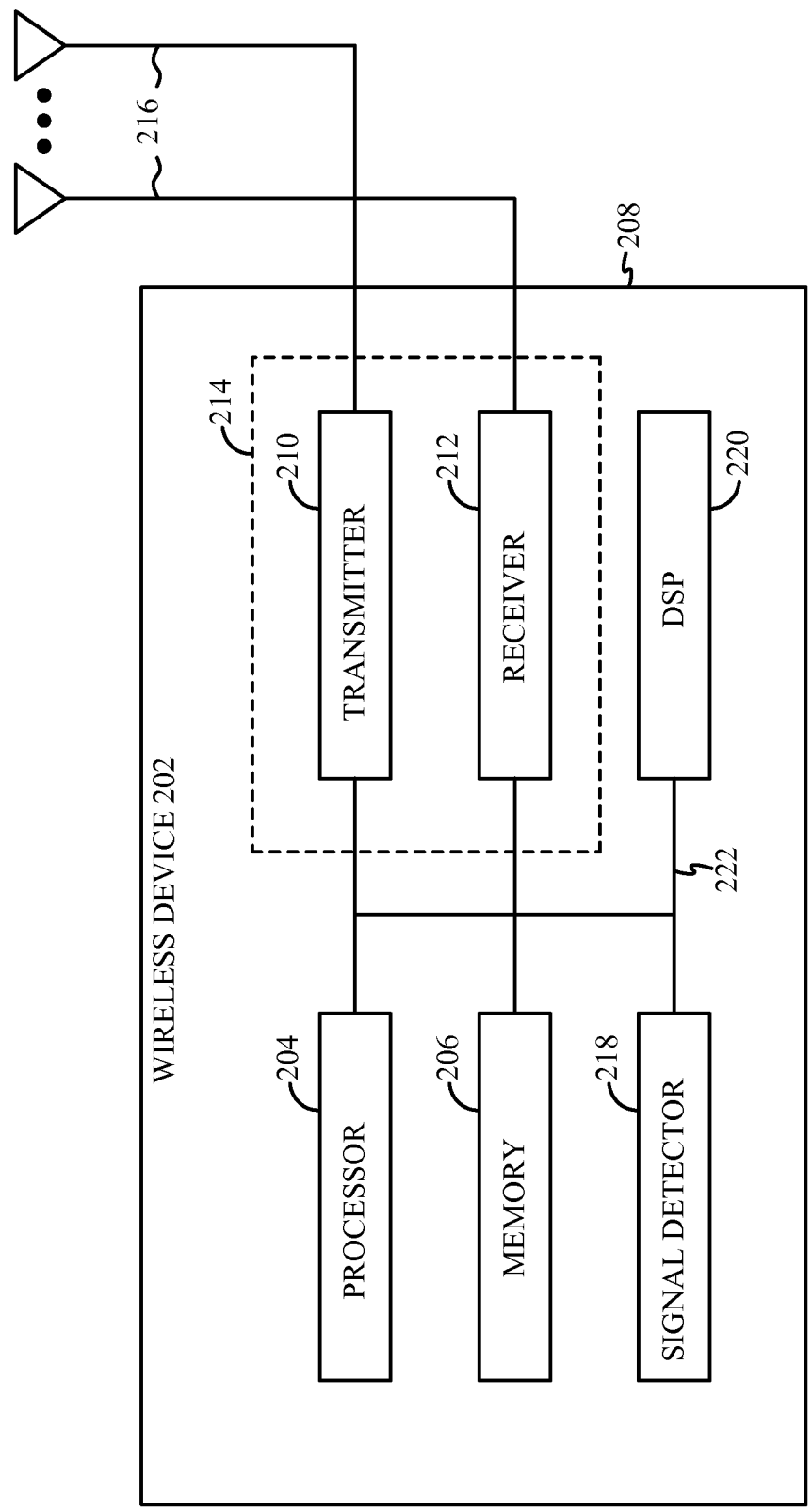
FIG. 2 illustrates various components that may be utilized in a wireless device in accordance with certain aspects of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. A single or a plurality of transmit antennas 216 may be attached to the housing 208 and electrically coupled to the transceiver 214. The wireless device 202 may also include (not shown) multiple transmitters, multiple receivers, and multiple transceivers.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
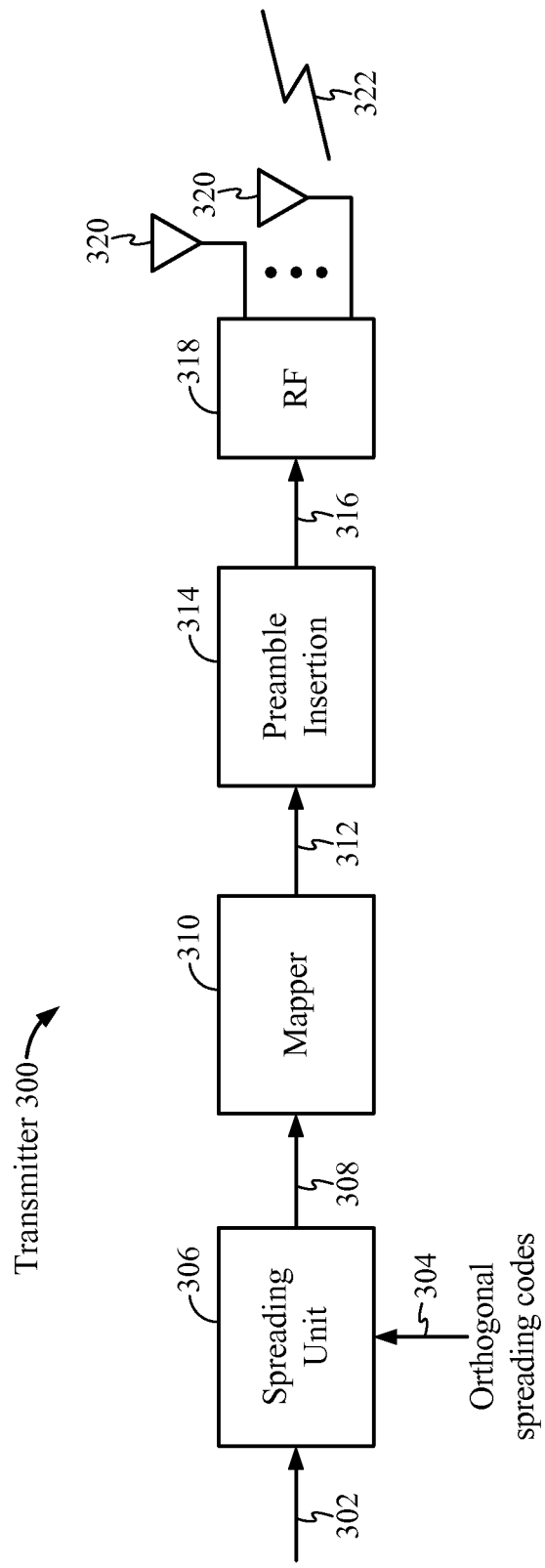
FIG. 3 illustrates an example transmitter that may be used within a wireless communication system in accordance with certain aspects of the present disclosure.

FIG. 3 illustrates an example of a transmitter 300 that may be used within a wireless communication system 100 that utilizes CDMA. Portions of the transmitter 300 may be implemented in the transmitter 210 of a wireless device 202. The transmitter 300 may be implemented in a base station 104 for transmitting data 302 to a user terminal 106 on a downlink 108. The transmitter 300 may also be implemented in a user terminal 106 for transmitting data 302 to a base station 104 on an uplink 110.

Data 302 to be transmitted represent a plurality of signals dedicated to different user terminals 106. Each signal from the plurality of signals may be spread in a spreading unit 306 by corresponding spreading code from a set of orthogonal spreading codes 304. The plurality of spread signals dedicated to different user terminals 106 may be summed to generate a cumulative signal 308. The cumulative signal 308 to be transmitted is shown being provided as input to a mapper 310. The mapper 310 may map the data stream 308 onto constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 310 may output a symbol stream 312, which may represent an input into a preamble insertion unit 314.

The preamble insertion unit 314 may be configured for inserting a preamble sequence at the beginning of the input symbol stream 312, and may generate a corresponding data stream 316. The preamble may be known at the receiver and may be utilized for time and frequency synchronization, channel estimation, equalization and channel decoding. The output 316 of the preamble insertion unit 314 may then be up-converted to a desired transmit frequency band by a radio frequency (RF) front end 318. At least one antenna 320 may then transmit a resulting signal 322 over a wireless channel.

The MIMO receiver 212 may comprise a hardware element to gather log-likelihood ratio (LLR) information of transmitted bits, such as the minimum mean square error (MMSE) equalization block associated with a LLR look-up table (LUT), or the Joint LLR (JLLR) detection block and any of its simplified versions. One simplified and faster version of the JLLR detection is the Max-Log Maximum a posteriori (MLM) decoding. In an exemplary case of two simultaneously transmitted data streams, one data stream can be typically decoded using an MMSE equalizer with adapted channel weights, which can be preceded by the serial interference cancellation (SIC) of another data stream. Therefore, two different decoding solutions can be distinguished in practice: the MMSE equalization with LLR LUT followed by another MMSE equalization with LLR LUT, and the JLLR decoding followed by the MMSE equalization with LLR LUT. However, computational complexity, implementation cost and processing latency of both schemes may be prohibitively high.

For a wireless system with receive diversity, such as an exemplary system with one transmit antenna and two receive antennas, a noise-whitened signal followed by maximum ratio combining (MRC) or zero-forced (ZF) equalization may produce optimal log-likelihood ratios (LLRs) at the receiver. However, in order to achieve this, the noise variance may need to be scaled properly by a certain factor which may not be known.

Certain aspects of the present disclosure support an alternative method to accurately compute LLRs of the transmitted signal along with efficient interference cancellation. The proposed method utilizes a single engine for processing of all modes of operation, such as MIMO, receive diversity, and space-time coding (STC).

Interference Cancellation Based on MLM Scheme in MIMO and Non-MIMO Systems

In the case of multiple-input multiple-output (MIMO) signaling, joint log-likelihood ratio (JLLR) estimation can produce error rate performance results which are typically 1-2 dB better than MMSE equalization based methods. However, computational complexity of the JLLR estimation can be prohibitively high. On the other hand, the Max-log MAP (MLM) receiver may perform within 0.1 dB of the JLLR receiver, while computational complexity of the MLM decoding may be significantly smaller.

Furthermore, in the case of receive diversity and the STC, a pre-equalization may need to be applied before MMSE equalization in order to obtain LLRs of transmitted bits. The computed LLRs may represent optimal LLRs assuming that the pre-equalization is performed correctly. However, instead of employing the additional pre-equalization, the same MLM decoding block (or, in general, the JLLR decoding block) used for MIMO signaling may be directly employed in the case of receive diversity and the STC.

Certain aspects of the present disclosure support serial interference cancellation (SIC) based on MLM decoding followed by one or more MLM algorithms. In general, the number of sequentially applied MLM schemes may correspond to the number of simultaneously transmitted independent data streams. However, the same MLM decoding block may be used multiple times, which may substantially reduce an implementation cost of the receiver. Though theoretically the error rate performance should be slightly worse, the MLM-based solution may perform in practice better than current implementations because the MMSE equalizer may be susceptible to fixed point and computation losses.

Figure 4:
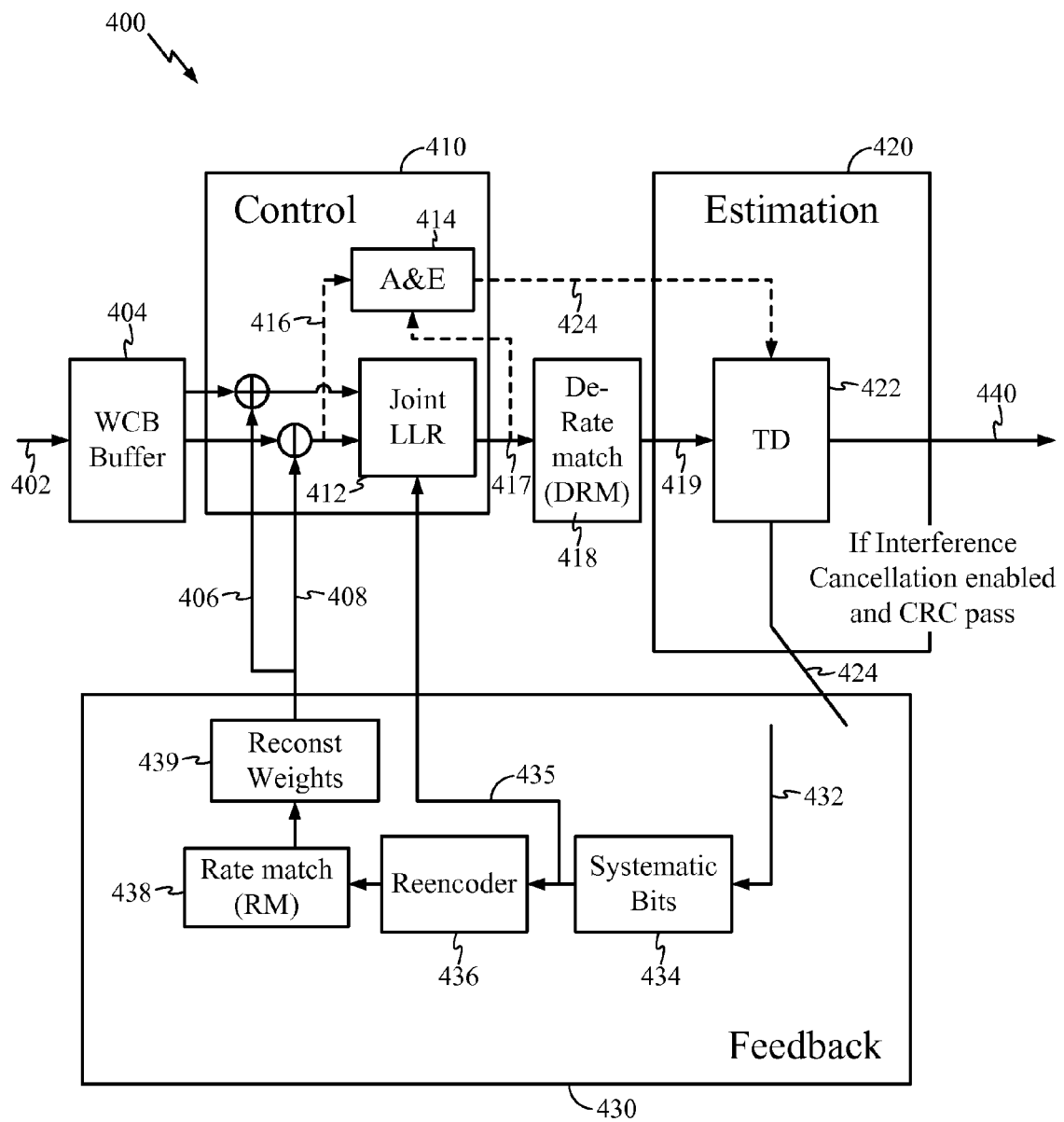
FIG. 4 illustrates an example receiver designed for interference removal in accordance with certain aspects of the present disclosure.

FIG. 4 illustrates an example block diagram for interference removal at the receiver based on the JLLR estimation algorithm in accordance with certain aspects of the present disclosure. The proposed receiver 400 illustrated in FIG. 4 represents unified architecture that may support different modes of operation, such as MIMO, STC and receiver diversity.

The receiver 400 may comprise a control portion 410, an estimation portion 420 and a feedback portion 430. A received signal 402 may be first stored at a write control buffer (WCB) 404 and then input into a Joint LLR decoding block 412 of the control portion 410. The Joint LLR decoding block 412 may perform decoding based on the simplified and faster MLM scheme. A posteriori log-likelihood ratios (LLRs) 417 of transmitted bits may be obtained at the output of the Joint LLR block 412.

The received signal 416 at the input of the Joint LLR block 412 may be also fed into an amplitude-and-energy (A&E) block 414 to obtain average signal amplitude and energy 424. The average signal amplitude and energy 424 may be fed into the estimation block 420 to estimate signal amplitude and noise variance, used by a Turbo decoder 422. De-rate matching (DRM) operation may be applied by unit 418 on LLRs 417 to generate LLRs 419 of appropriate rate for the Turbo decoder 422. The Turbo decoder 422 may provide estimated decoded bits 440 after certain number of inner iterations of the Turbo decoder.

In order to improve error rate performance, the feedback 430 may be applied from the estimation portion 420 to the control portion 410. If the interference cancellation is enabled and the cyclic redundancy check (CRC) at the output of the outer Turbo decoder 422 passes, then a switch mechanism 424 may allow feedback from the Turbo decoder 422 to the inner Joint LLR block 412. One data stream may be fully decoded by the Turbo decoder 422, and then a hard interference of this data stream (i.e., decoded bits) may be removed from another data stream.

The Joint LLR block 412 may be utilized multiple times according to the number of independent simultaneously transmitted data streams. In the exemplary case of two simultaneously transmitted data streams, the Joint LLR block 412 on the second pass may need to utilize adapted channel coefficients in order to implicitly take into account cancelled interference. A posteriori LLRs 432 of the other data stream may be processed by a systematic block 434 to obtain hard decision (i.e., systematic bits 435) of the systematic a posteriori LLRs. The systematic bits 435 of the other data stream may be then re-encoded by unit 436, rate matching (RM) may be applied by unit 438 and a weight reconstruction block 439 may be utilized in order to generate reconstructed streams 406 and 408 of appropriate rate for the second pass of the Joint LLR block 412.

In one aspect of the present disclosure, elements of the MIMO channel matrix that correspond to the cancelled data stream may be set to zero values (i.e., one column of the channel matrix may be zeroed). In the case of receive diversity or the STC, the same methodology may be applied except that the interference cancellation may not be performed.

The a posteriori LLRs 432 of the Turbo decoder 422 may be utilized to estimate soft symbols of transmitted data streams. Corresponding variance of each soft symbol may be added to original noise covariance matrix as a part of the feedback processing. The new adapted noise covariance matrix may be given as:

$$R_{\tilde{n}} = (R_n + H \Lambda H^*), \tag{1}$$

where $R_n$ is the original non-adapted noise covariance matrix, $\Lambda$ is a diagonal matrix containing variance of each soft symbol, and H represents the MIMO channel matrix with updated elements after interference cancellation. The adapted noise covariance matrix defined by equation (1) may be used to whiten the channel coefficients and the received signal for the next processing iteration.

In the case of MIMO wireless system, the MRC receiver may be alternatively utilized to perform a serial interference cancellation (SIC). It can be again assumed, without loss of generality, the exemplary case of simultaneous transmission of two independent data streams from two transmit antennas. The Joint LLR block 412 may be initially used to calculate a posteriori LLRs for both data streams. By applying a switching mechanism, a particular data stream may be chosen for cancellation. It can be assumed, without loss of generality, that the first data stream is selected for cancellation. If the CRC at the output of outer decoder passes, then a hard interference may be removed from the second data stream, as illustrated in FIG. 4.

Instead of JLLR, noise whitening may be applied and the MRC processing may be employed. Alternatively, the MMSE equalization may be applied instead of MRC, and then LLRs may be computed using LUT. However, it can be observed error rate performance improvement if the JLLR scheme is used in wideband CDMA systems instead of MRC and MMSE algorithms.

Figure 5:
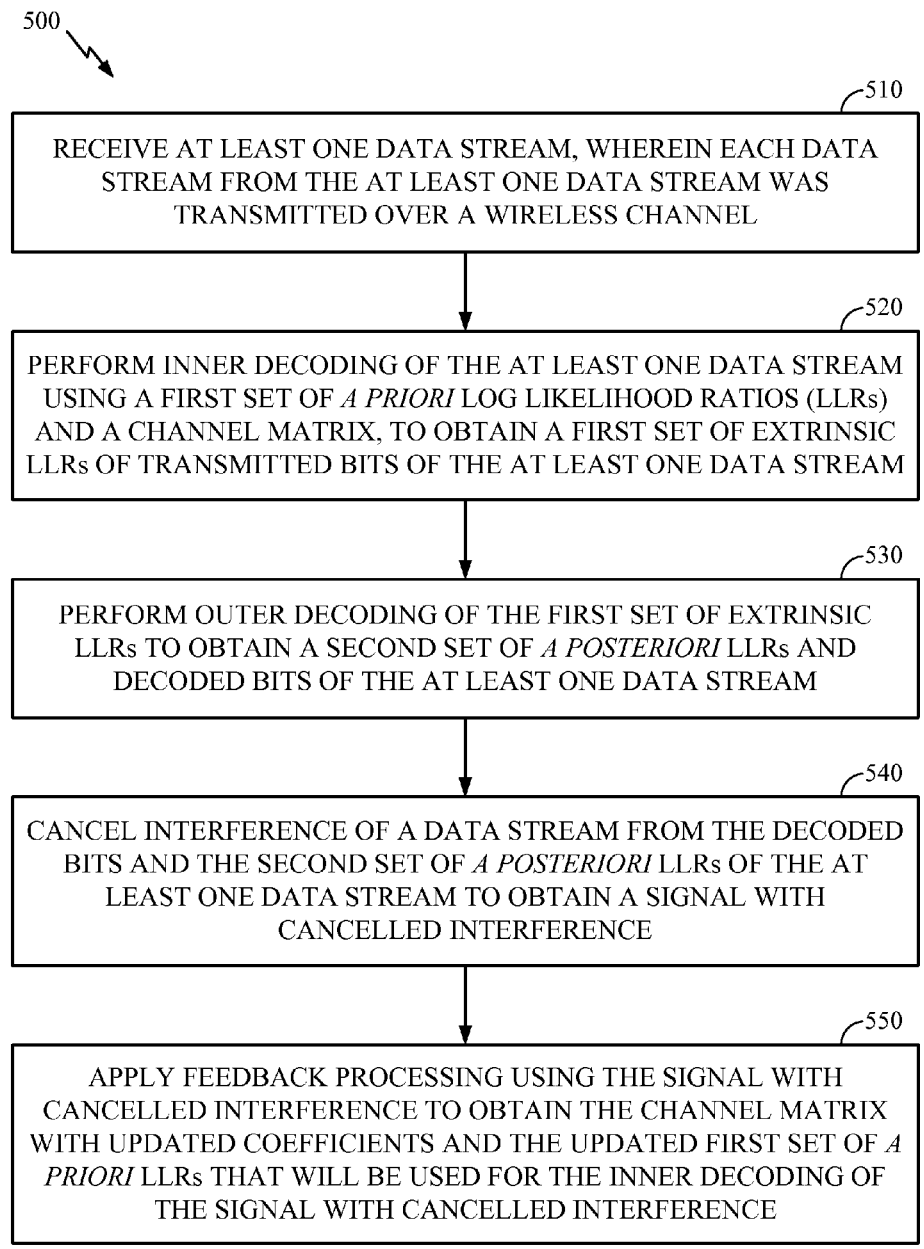
FIG. 5 illustrates example operations for interference removal in accordance with certain aspects of the present disclosure.

FIG. 5 summarizes example operations 500 for interference cancellation based on JLLR decoding. At 510, at least one data stream transmitted over a wireless channel may be received at a receiver. At 520, inner decoding (for example, JLLR decoding or any of its simplified versions, such as the MLM decoding) of the at least one data stream using a first set of a priori LLRs and a channel matrix may be performed to obtain a first set of extrinsic LLRs of transmitted bits of the at least one data stream.

At 530, the first set of extrinsic LLRs may be decoded, for example by employing outer Turbo decoding, to obtain a second set of a posteriori LLRs and to obtain decoded bits of the at least one data stream. At 540, interference of a data stream may be cancelled from the decoded bits and from the second set of a posteriori LLRs of the at least one data stream to obtain a signal with cancelled interference. At 550, feedback processing may be applied on the signal with cancelled interference to obtain the channel matrix with updated coefficients and the updated first set of a priori LLRs, wherein the channel matrix with updated coefficients and the updated first set of a priori LLRs will be used for the inner decoding of the signal with cancelled interference. Following this, the operations 520-550 may be repeated.

Benefit of the proposed interference cancellation technique based on JLLR decoding is that the complexity required for implementation of separate MMSE equalization block is removed. In addition, processing latency of the proposed approach may be smaller compared to the MMSE-based equalization solution. In the case of wideband CDMA systems, the improvement in processing latency may be approximately 14%, and the error rate performance improvement may be as much as 0.3 dB compared to the MMSE-based equalization techniques.

Figure 6:
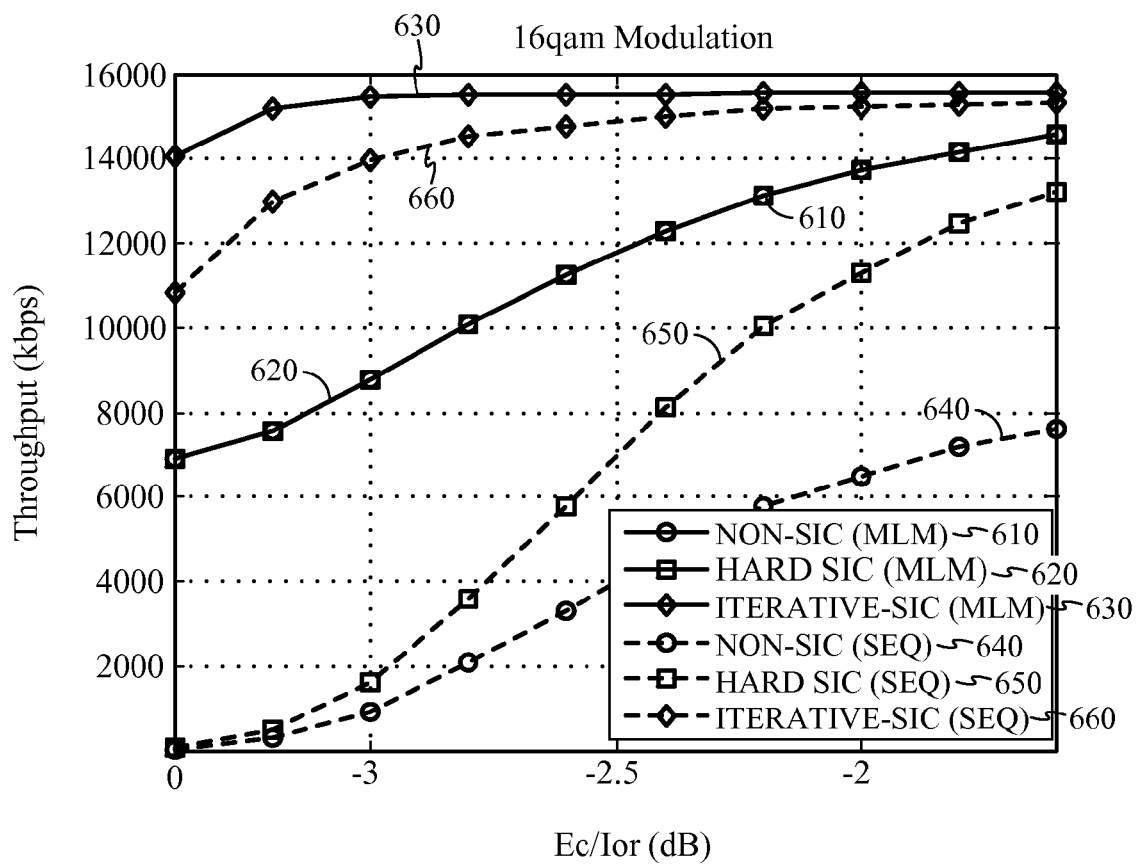
FIG. 6 illustrates a graph of example throughput performance for different decoding schemes with 16-QAM modulation in accordance with certain aspects of the present disclosure.
Figure 7:
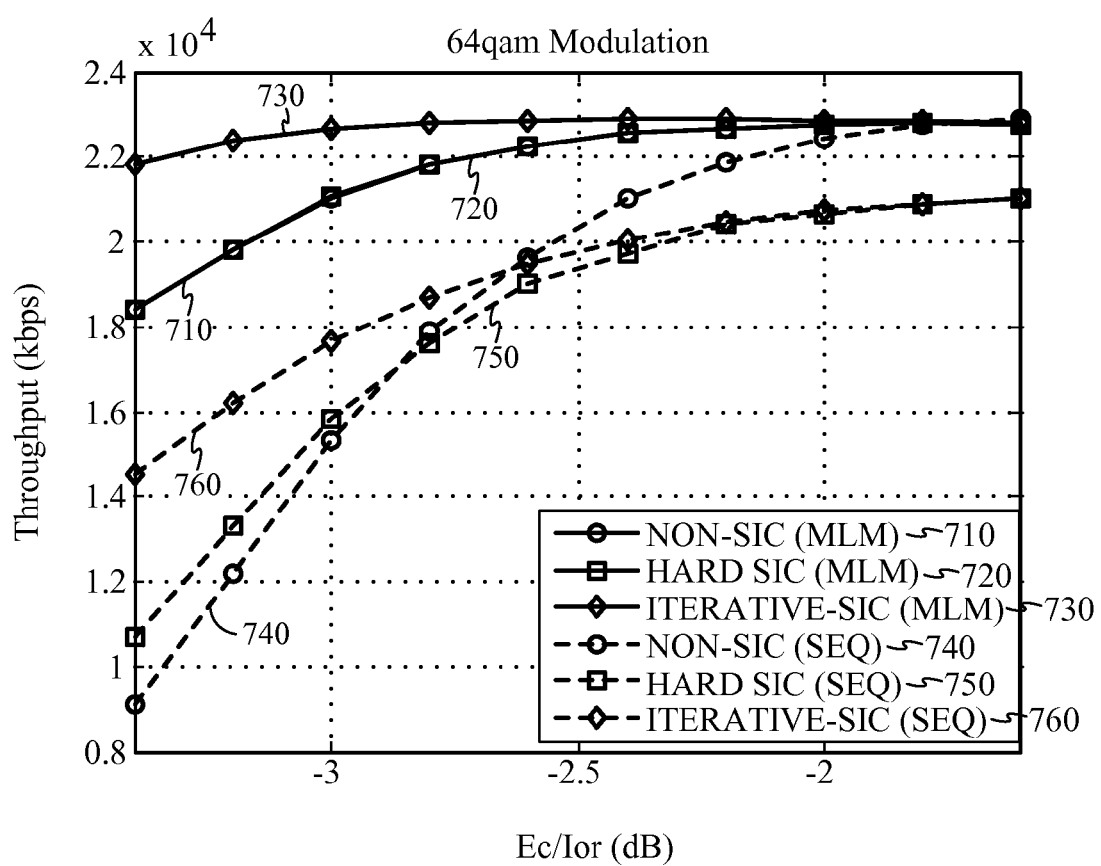
FIG. 7 illustrates a graph of example throughput performance for different decoding schemes with 64-QAM modulation in accordance with certain aspects of the present disclosure.

FIG. 6 and FIG. 7 illustrate graphs of example data throughput performance for different decoding schemes in the case of 16-QAM and 64-QAM modulations, respectively. It is again assumed a wireless system with two transmit and two receive antennas. The 2×2 channel matrix used in these exemplary simulations is given as:

$$H = \begin{bmatrix} 1 & 0.7 \\ 0.7 & 1 \end{bmatrix}. \tag{2}$$

The outer Turbo decoding is applied with code rate of 0.92 and 0.68 for 16-QAM and 64-QAM, respectively.

The proposed Hard-SIC (MLM) scheme (i.e., plots 620 and 720) can be compared with the Hard-SIC (symbol equalization—SEQ) scheme based on MMSE equalization (i.e., plots 650 and 750). It can be observed significant throughput improvement of the proposed Hard-SIC MLM scheme. In addition, the iterative (i.e., soft) SIC based on MLM technique may further increase data throughput (i.e., plots 630 and 730). It can be also observed that similar throughput as in the case of Hard-SIC MLM scheme may be achieved if the MLM is applied without interference cancellation (i.e., plot 610 vs. 620 in FIG. 6, and plot 710 vs. 720 in FIG. 7). However, error rate performance of the non-SIC MLM scheme is substantially worse compared to the Hard-SIC MLM scheme.

Figure 5A:
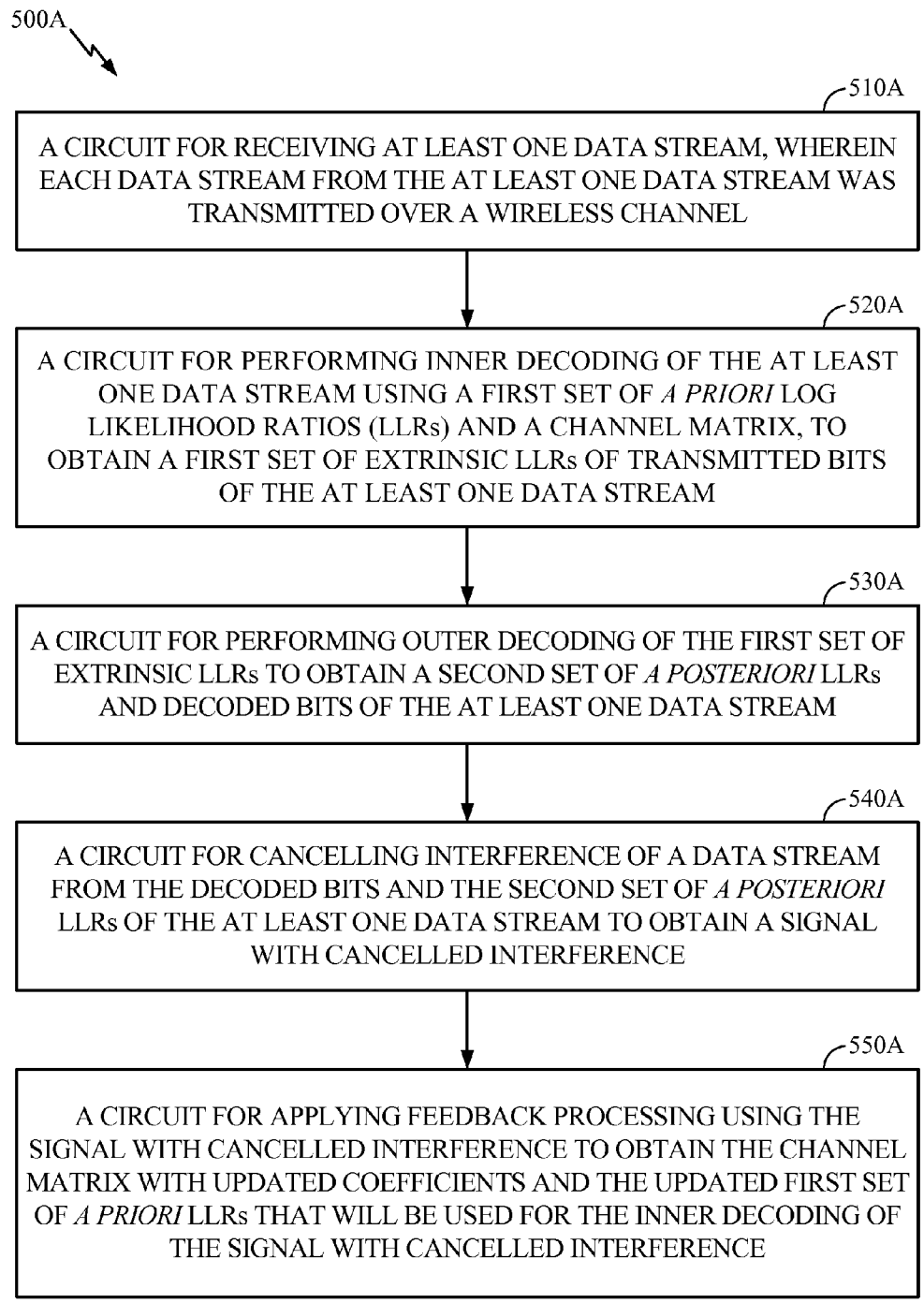
FIG. 5A illustrates example components capable of performing the operations illustrated in FIG. 5.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, blocks 510-550 illustrated in FIG. 5 correspond to circuit blocks 510A-550A illustrated in FIG. 5A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The techniques provided herein may be utilized in a variety of applications. For certain aspects, the techniques presented herein may be incorporated in an access point station, an access terminal, or other type of wireless device with processing logic and elements to perform the techniques provided herein.

The invention claimed is:

1. A method for wireless communications, comprising:
receiving at least one data stream, wherein each data stream from the at least one data stream was transmitted over a wireless channel;
performing inner decoding of the at least one data stream using a first set of a priori log-likelihood ratios (LLRs) and a channel matrix comprising estimates of the wireless channel to obtain a first set of extrinsic LLRs of transmitted bits of the at least one data stream;
performing outer decoding of the first set of extrinsic LLRs to obtain a second set of a posteriori LLRs and decoded bits of the at least one data stream;
cancelling interference of a data stream from the decoded bits and from the second set of a posteriori LLRs of the at least one data stream to obtain a signal with cancelled interference, if the at least one data stream comprises at least two data streams and two or more independent data streams of the at least two data streams were simultaneously transmitted from multiple antennas; and
applying feedback processing using the signal with cancelled interference to obtain the channel matrix with updated coefficients and the updated first set of a priori LLRs, wherein the channel matrix with updated coefficients and the updated first set of a priori LLRs will be used for the inner decoding of the signal with cancelled interference, if the two or more independent data streams were simultaneously transmitted from multiple antennas,
wherein receiving the at least one data stream comprises receiving one data stream using two receive antennas, and
wherein performing inner decoding comprises decoding using a portion of the first set of the a priori log likelihood ratios (LLRs), the received data stream at each receive antenna, and a column of the channel matrix.

2. A method for wireless communications, comprising:
receiving at least one data stream, wherein each data stream from the at least one data stream was transmitted over a wireless channel;
performing inner decoding of the at least one data stream using a first set of a priori log-likelihood ratios (LLRs) and a channel matrix comprising estimates of the wireless channel to obtain a first set of extrinsic LLRs of transmitted bits of the at least one data stream;
performing outer decoding of the first set of extrinsic LLRs to obtain a second set of a posteriori LLRs and decoded bits of the at least one data stream;
cancelling interference of a data stream from the decoded bits and from the second set of a posteriori LLRs of the at least one data stream to obtain a signal with cancelled interference, if the at least one data stream comprises at least two data streams and two or more independent data streams of the at least two data streams were simultaneously transmitted from multiple antennas; and
applying feedback processing using the signal with cancelled interference to obtain the channel matrix with updated coefficients and the updated first set of a priori LLRs, wherein the channel matrix with updated coefficients and the updated first set of a priori LLRs will be used for the inner decoding of the signal with cancelled interference, if the two or more independent data streams were simultaneously transmitted from multiple antennas,
wherein receiving the at least one data stream comprises receiving one data stream using a receive antenna, and
wherein performing inner decoding comprises decoding using a portion of the first set of the a priori log likelihood ratios (LLRs), the received data stream and an element of the channel matrix.

3. A method for wireless communications, comprising:
receiving at least one data stream, wherein each data stream from the at least one data stream was transmitted over a wireless channel;
performing inner decoding of the at least one data stream using a first set of a priori log-likelihood ratios (LLRs) and a channel matrix comprising estimates of the wireless channel to obtain a first set of extrinsic LLRs of transmitted bits of the at least one data stream;
performing outer decoding of the first set of extrinsic LLRs to obtain a second set of a posteriori LLRs and decoded bits of the at least one data stream;
cancelling interference of a data stream from the decoded bits and from the second set of a posteriori LLRs of the at least one data stream to obtain a signal with cancelled interference, if the at least one data stream comprises at least two data streams and two or more independent data streams of the at least two data streams were simultaneously transmitted from multiple antennas;
applying feedback processing using the signal with cancelled interference to obtain the channel matrix with updated coefficients and the updated first set of a priori LLRs, wherein the channel matrix with updated coefficients and the updated first set of a priori LLRs will be used for the inner decoding of the signal with cancelled interference, if the two or more independent data streams were simultaneously transmitted from multiple antennas;
updating the first set of a priori LLRs based on the signal with cancelled interference;
re-encoding a systematic portion of the signal with cancelled interference to obtain a re-encoded signal with cancelled interference;
rate matching the re-encoded signal to obtain a rate-matched re-encoded signal with cancelled interference; and
updating coefficients of the channel matrix using the rate-matched re-encoded signal with cancelled interference.

4. The method of claim 3, wherein updating coefficients of the channel matrix further comprises setting all coefficients of a column of the channel matrix that corresponds to the cancelled data stream to zero values.

5. The method of claim 3, further comprising:
computing a variance for each soft symbol of the at least one transmitted data stream based on the second set of a priori LLRs;
adapting a noise covariance matrix based on a non-adapted noise covariance matrix, on the computed variance for each soft symbol and on the updated coefficients of the channel matrix; and
whitening the signal with cancelled interference and the channel matrix with updated coefficients using the adapted noise covariance matrix.

6. An apparatus for wireless communications, comprising:
a receiver configured to receive at least one data stream, wherein each data stream from the at least one data stream was transmitted over a wireless channel;
an inner decoder configured to perform inner decoding of the at least one data stream using a first set of a priori log-likelihood ratios (LLRs) and a channel matrix comprising estimates of the wireless channel to obtain a first set of extrinsic LLRs of transmitted bits of the at least one data stream;
an outer decoder configured to perform outer decoding of the first set of extrinsic LLRs to obtain a second set of a posteriori LLRs and decoded bits of the at least one data stream;
a cancelling circuit configured to cancel interference of a data stream from the decoded bits and from the second set of a posteriori LLRs of the at least one data stream to obtain a signal with cancelled interference, if the at least one data stream comprises at least two data streams and two or more independent data streams of the at least two data streams were simultaneously transmitted from multiple antennas; and
a feedback circuit configured to apply feedback processing using the signal with cancelled interference to obtain the channel matrix with updated coefficients and the updated first set of a priori LLRs, wherein the channel matrix with updated coefficients and the updated first set of a priori LLRs will be used for the inner decoding of the signal with cancelled interference, if the two or more independent data streams were simultaneously transmitted from multiple antennas,
wherein the receiver configured to receive the at least one data stream comprises a circuit configured to receive one data stream using two receive antennas, and
wherein the inner decoder configured to perform inner decoding comprises a circuit configured to decode using a portion of the first set of the a priori log likelihood ratios (LLRs), the received data stream at each receive antenna, and a column of the channel matrix.

7. An apparatus for wireless communications, comprising:
a receiver configured to receive at least one data stream, wherein each data stream from the at least one data stream was transmitted over a wireless channel;
an inner decoder configured to perform inner decoding of the at least one data stream using a first set of a priori log-likelihood ratios (LLRs) and a channel matrix comprising estimates of the wireless channel to obtain a first set of extrinsic LLRs of transmitted bits of the at least one data stream;

an outer decoder configured to perform outer decoding of the first set of extrinsic LLRs to obtain a second set of a posteriori LLRs and decoded bits of the at least one data stream;

a cancelling circuit configured to cancel interference of a data stream from the decoded bits and from the second set of a posteriori LLRs of the at least one data stream to obtain a signal with cancelled interference, if the at least one data stream comprises at least two data streams and two or more independent data streams of the at least two data streams were simultaneously transmitted from multiple antennas; and a feedback circuit configured to apply feedback processing using the signal with cancelled interference to obtain the channel matrix with updated coefficients and the updated first set of a priori LLRs, wherein the channel matrix with updated coefficients and the updated first set of a priori LLRs will be used for the inner decoding of the signal with cancelled interference, if the two or more independent data streams were simultaneously transmitted from multiple antennas, wherein the receiver configured to receive the at least one data stream comprises a circuit configured to receive one data stream using a receive antenna, and wherein the inner decoder configured to perform inner decoding comprises a circuit configured to decode using a portion of the first set of the a priori log likelihood ratios (LLRs), the received data stream and an element of the channel matrix.

8. An apparatus for wireless communications, comprising:

a receiver configured to receive at least one data stream, wherein each data stream from the at least one data stream was transmitted over a wireless channel;

an inner decoder configured to perform inner decoding of the at least one data stream using a first set of a priori log-likelihood ratios (LLRs) and a channel matrix comprising estimates of the wireless channel to obtain a first set of extrinsic LLRs of transmitted bits of the at least one data stream;

an outer decoder configured to perform outer decoding of the first set of extrinsic LLRs to obtain a second set of a posteriori LLRs and decoded bits of the at least one data stream;

a cancelling circuit configured to cancel interference of a data stream from the decoded bits and from the second set of a posteriori LLRs of the at least one data stream to obtain a signal with cancelled interference, if the at least one data stream comprises at least two data streams and two or more independent data streams of the at least two data streams were simultaneously transmitted from multiple antennas; and a feedback circuit configured to apply feedback processing using the signal with cancelled interference to obtain the channel matrix with updated coefficients and the updated first set of a priori LLRs, wherein the channel matrix with updated coefficients and the updated first set of a priori LLRs will be used for the inner decoding of the signal with cancelled interference, if the two or more independent data streams were simultaneously transmitted from multiple antennas, wherein the feedback circuit comprises:

a first circuit configured to update the first set of a priori LLRs based on the signal with cancelled interference;

an encoding circuit configured to re-encode a systematic portion of the signal with cancelled interference to obtain a re-encoded signal with cancelled interference;

a rate matching circuit configured to rate match the re-encoded signal to obtain a rate-matched re-encoded signal with cancelled interference; and a second circuit configured to update coefficients of the channel matrix using the rate -matched re-encoded signal with cancelled interference.

9. The apparatus of claim 8, wherein the second circuit configured to update coefficients of the channel matrix further comprises a third circuit configured to set all coefficients of a column of the channel matrix that corresponds to the cancelled data stream to zero values.

10. The apparatus of claim 8, further comprising:

a computing circuit configured to compute a variance for each soft symbol of the at least one transmitted data stream based on the second set of a priori LLRs;

an adapter configured to adapt a noise covariance matrix based on a non-adapted noise covariance matrix, on the computed variance for each soft symbol and on the updated coefficients of the channel matrix; and a whitening circuit configured to whiten the signal with cancelled interference and the channel matrix with updated coefficients using the adapted noise covariance matrix.

11. An apparatus for wireless communications, comprising:

means for receiving at least one data stream, wherein each data stream from the at least one data stream was transmitted over a wireless channel;

means for performing inner decoding of the at least one data stream using a first set of a priori log-likelihood ratios (LLRs) and a channel matrix comprising estimates of the wireless channel to obtain a first set of extrinsic LLRs of transmitted bits of the at least one data stream;

means for performing outer decoding of the first set of extrinsic LLRs to obtain a second set of a posteriori LLRs and decoded bits of the at least one data stream;

means for cancelling interference of a data stream from the decoded bits and from the second set of a posteriori LLRs of the at least one data stream to obtain a signal with cancelled interference, if at the at least one data stream comprises at least two data streams and two or more independent data streams of the at least two data streams were simultaneously transmitted from multiple antennas; and means for applying feedback processing using the signal with cancelled interference to obtain the channel matrix with updated coefficients and the updated first set of a priori LLRs, wherein the channel matrix with updated coefficients and the updated first set of a priori LLRs will be used for the inner decoding of the signal with cancelled interference, if the two or more independent data streams were simultaneously transmitted from multiple antennas wherein said means for receiving the at least one data stream comprises means for receiving one data stream using two receive antennas, and wherein said means for performing inner decoding comprises means for decoding using a portion of the first set of the a priori log likelihood ratios (LLRs), the received data stream at each receive antenna, and a column of the channel matrix.

12. A computer-program product for wireless communications, comprising a non-transitory computer-readable medium comprising instructions executable to:

receive at least one data stream, wherein each data stream from the at least one data stream was transmitted over a wireless channel;

perform inner decoding of the at least one data stream using a first set of a priori log-likelihood ratios (LLRs) and a channel matrix comprising estimates of the wireless channel to obtain a first set of extrinsic LLRs of transmitted bits of the at least one data stream;

perform outer decoding of the first set of extrinsic LLRs to obtain a second set of a posteriori LLRs and decoded bits of the at least one data stream;

cancel interference of a data stream from the decoded bits and from the second set of a posteriori LLRs of the at least one data stream to obtain a signal with cancelled interference, if the at least one data stream comprises at least two data streams and two or more independent data streams of the at least two data streams were simultaneously transmitted from multiple antennas; and apply feedback processing using the signal with cancelled interference to obtain the channel matrix with updated coefficients and the updated first set of a priori LLRs, wherein the channel matrix with updated coefficients and the updated first set of a priori LLRs will be used for the inner decoding of the signal with cancelled interference, if the two or more independent data streams were simultaneously transmitted from multiple antennas, wherein receiving the at least one data stream comprises receiving one data stream using two receive antennas, and wherein performing inner decoding comprises decoding using a portion of the first set of the a priori log likelihood ratios (LLRs), the received data stream at each receive antenna, and a column of the channel matrix.

13. A wireless node, comprising:

at least one antenna;

a receiver configured to receive at least one data stream via the at least one antenna, wherein each data stream from the at least one data stream was transmitted over a wireless channel, wherein receiving the at least one data stream comprises receiving one data stream using two receive antennas;

an inner decoder configured to perform inner decoding of the at least one data stream using a first set of a priori log-likelihood ratios (LLRs) and a channel matrix comprising estimates of the wireless channel to obtain a first set of extrinsic LLRs of transmitted bits of the at least one data stream, wherein performing inner decoding comprises decoding using a portion of the first set of the a priori log likelihood ratios (LLRs), the received data stream at each receive antenna, and a column of the channel matrix;

an outer decoder configured to perform outer decoding of the first set of extrinsic LLRs to obtain a second set of a posteriori LLRs and decoded bits of the at least one data stream;

a cancelling circuit configured to cancel interference of a data stream from the decoded bits and from the second set of a posteriori LLRs of the at least one data stream to obtain a signal with cancelled interference, if the at least one data stream comprises at least two data streams and two or more independent data streams of the at least two data streams were simultaneously transmitted from multiple antennas; and a feedback circuit configured to apply feedback processing using the signal with cancelled interference to obtain the channel matrix with updated coefficients and the updated first set of a priori LLRs, wherein the channel matrix with updated coefficients and the updated first set of a priori LLRs will be used for the inner decoding of the signal with cancelled interference, if the two or more independent data streams were simultaneously transmitted from multiple antennas.

\* \* \* \* \*